United States Patent [19]

Mathevet

[11] 4,237,953
[45] Dec. 9, 1980

[54] RADIAL TIRE WITH TREAD REINFORCEMENT COMPRISING NONFOLDED PLIES WITH RADIALLY INCREASING AXIAL WIDTHS

[75] Inventor: Albert Mathevet, Chamalieres, France

[73] Assignee: Compagnie Generale des Etablissements Michelin, Clermont-Ferrand, France

[21] Appl. No.: 14,341

[22] Filed: Feb. 23, 1979

Related U.S. Application Data

[63] Continuation of Ser. No. 812,120, Jul. 1, 1977, abandoned.

[30] Foreign Application Priority Data

Jul. 12, 1976 [FR] France .................. 76 21373

[51] Int. Cl.³ .................. B60C 9/20
[52] U.S. Cl. .................. 152/361 FP; 152/361 DM
[58] Field of Search ...... 152/361 R, 361 FP, 361 DM

[56] References Cited

U.S. PATENT DOCUMENTS

| 3,205,931 | 9/1965 | Keefe .................. 152/361 X |
| 3,357,470 | 12/1967 | Massoubre .................. 152/361 FP |
| 3,794,097 | 2/1974 | Kind .................. 152/361 R X |
| 3,799,230 | 3/1974 | Montagne .................. 152/361 FP |
| 3,881,538 | 5/1975 | Mirtain .................. 152/361 DM X |
| 3,945,421 | 3/1976 | Poque et al. .................. 152/361 FP |
| 3,949,797 | 4/1976 | Mirtain et al. .................. 152/361 DM |
| 4,034,791 | 7/1977 | Mirtain .................. 152/361 DM |
| 4,120,339 | 10/1978 | Shichman .................. 152/361 R X |

FOREIGN PATENT DOCUMENTS

| 2250284 | 4/1974 | Fed. Rep. of Germany .......... 152/361 |
| 2355338 | 5/1975 | Fed. Rep. of Germany .... 152/361 FP |
| 2508360 | 8/1975 | Fed. Rep. of Germany .... 152/361 FP |
| 973944 | 11/1964 | United Kingdom .................. 152/361 |

Primary Examiner—John T. Goolkasian
Assistant Examiner—Lois E. Rodgers
Attorney, Agent, or Firm—Brumbaugh, Graves, Donohue & Raymond

[57] ABSTRACT

A tire having a radial carcass reinforcement and a tread reinforcement formed of at least two nonfolded diagonal superposed plies of different widths and of at least one diagonal ply with two folded edges, each of said folded edges resting on at least a portion of a nonfolded ply, is improved against structural defects by an arrangement wherein the nonfolded plies have axial widths which increase with the radial distances of said plies from the axis of the tire and wherein the ply with folded edges is so arranged that its folded edges cover at least the edges of the widest nonfolded ply.

17 Claims, 6 Drawing Figures

RADIAL TIRE WITH TREAD REINFORCEMENT COMPRISING NONFOLDED PLIES WITH RADIALLY INCREASING AXIAL WIDTHS

This is a continuation of application Ser. No. 812,120, filed July 1, 1977, now abandoned.

The present invention relates to improvements in pneumatic tires. More particularly, it concerns reinforcements for pneumatic tires of the type having at least in part a radial carcass, capped by a tread reinforcement.

The tread reinforcements used in tires of the type in question at times have diagonal plies of large width whose edges may be folded over the other diagonal plies, which themselves have nonfolded edges. The purpose of these foldings is to impart higher rigidity along certain areas to the tread reinforcements thus constituted.

Thus, it has been proposed to use for the construction of such a tread reinforcement two nonfolded diagonal plies, the wider ply being the one closest the carcass reinforcement, and a third diagonal ply provided with more flexible reinforcement elements which is arranged between the carcass reinforcement and the said wider ply and has its edges folded over the edges of the other two plies.

Such a tread reinforcement satisfies the conventional teaching that the widths of the nonfolded plies should decrease when the radial distance between the said ply and the axis of rotation of the tire increases, subject otherwise to the premature appearance of structural defects which jeopardize the life of the tire.

Nevertheless, the tread reinforcement described above is not free of these structural defects, even when the folded edge of the third ply covers the edges of the narrowest ply furthest removed radially from the carcass reinforcement. On the contrary, separation commences between the edges of the two nonfolded plies. It then progresses between the edge of the narrower nonfolded ply and the folded edge of the third ply and then widens in the direction towards the equatorial plane of the tire so as to make the tire useless.

The object of the present invention is to overcome this structural defect of tread reinforcements having at least two superposed nonfolded plies of different widths and at least one third ply whose edges are folded so as to cover the edges of the nonfolded plies.

Thus, the pneumatic tire in accordance with the present invention having, at least in part, a radial carcass reinforcement and a tread reinforcement formed of at least two nonfolded diagonal superposed plies of different widths and of at least one diagonal ply with two folded edges, each of said folded edges resting on at least a portion of a nonfolded ply, is characterized by the fact that the nonfolded plies have axial widths which increase with the radial distances of said plies from the axis of the tire and by the fact that the ply with folded edges is so arranged that its folded edges cover at least the edges of the widest nonfolded ply.

In a first variant of the present invention, the widths of the folded edges of the folded tread reinforcement ply are such that the axial distance between the ends of these folded edges is greater than the axial width of the narrowest nonfolded ply, that is to say the nonfolded ply closest to the carcass reinforcement.

Another variant contemplates the use of folded edges of the folded treat reinforcement ply which have such a width that the axial distance between the ends of these folded edges is smaller than the axial width of the narrowest nonfolded ply. This variant makes it possible, in case of need, to increase the previously described rigidity effect due to the folded edges of said ply.

These two variants may advantageously be combined with a third variant in which the fold lines of the edges of the folded tread reinforcement ply are located at an axial distance apart which is greater than the axial width of the widest nonfolded tread reinforcement ply and is preferably between 105% and 200% of said width.

Such an arrangement may even extend to a protruding of the tread reinforcement in the shoulders of the tire. It offers the advantage of forming both a transition zone of intermediate rigidity between the sidewalls which are reinforced solely by the very flexible radial carcass reinforcement and the very rigid tread reinforcement, and a transition zone which is firmly connected with the tread reinforcement.

It is also advantageous to use, in combination with any of the above variants, relatively flexible cables, for instance, of textile, or metal cables of flexible type in the ply with folded edges and more rigid cables, for instance, metal cables, in the nonfolded plies.

Finally, the principle of the tread reinforcement in accordance with the present invention applies to tread reinforcement of symmetrical or asymmetrical effect and/or structure with respect to the equatorial plane of the tire and whatever may be the materials and/or types of elements used to reinforce the folded or nonfolded tread plies.

The arrangement of the tread reinforcement plies in accordance with the present invention, although being contrary to the rule of tiering the widths of the nonfolded treat reinforcement plies which has been set forth above, has the effect of not only delaying in unexpected fashion the appearance of separation between the edges of the nonfolded tread reinforcement plies but also, in cases in which such separation should appear, of delaying, if not stopping, the progression thereof, said progression having first of all to take place axially towards the outside in order to move around the edge of the widest nonfolded ply and finally progressing between the edge of the widest nonfolded ply and the folded edge of the folded tread reinforcement ply. Figuratively speaking, the arrangement in accordance with the present invention forces the separation between the tread reinforcement plies, if it can start, to follow a labyrinthine course which makes the progression thereof impossible or at least very slow and difficult.

The ply with folded edges is preferably arranged with its unfolded portion between the carcass reinforcement and the nonfolded plies of different widths, because its manufacture is easier. However, the present invention also extends to the case where the unfolded portion of the ply with folded edges is arranged radially outward of the nonfolded plies of different widths.

The figures of the drawing and the portion of the description referring thereto are intended to illustrate practical embodiments of the present invention, without however limiting the scope of the present invention.

Figure 1:
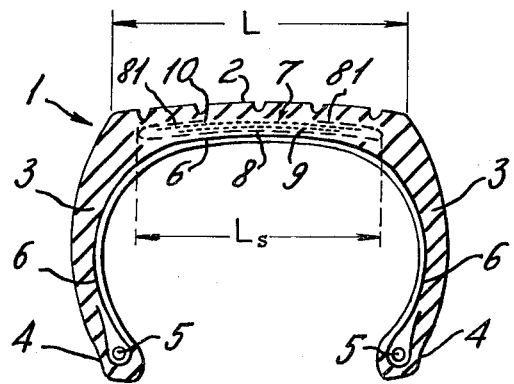
FIG. 1 is a radial sectional view through a tire provided with a tread reinforcement in accordance with the present invention.

In all the figures of the drawing, the reinforcing elements (for instance, cables) of the different plies of the tread reinforcement have been shown with exaggerated spacing between them in order to make the drawing clearer.

FIG. 1 shows a tire 1 having, as customary, a tread 2 extended on each side by a sidewall 3 which terminates in a bead 4 which is strengthened by a bead ring 5. A carcass reinforcement 6 composed of cables arranged in radial planes is turned around each of the two bead rings 5 and passes into the sidewalls 3 and beneath the tread 2. Between this carcass reinforcement 6 and the tread 2, there is arranged a tread reinforcement 7 intended to impart rigidity to the tread 2. This tread reinforcement 7 is composed of three superposed plies 8, 9 and 10 of diagonal cables. These three plies are arranged as follows: the ply 8 is adjacent the carcass reinforcement 6 and has two folded edges 81; the nonfolded ply 9 is just above the unfolded portion of the ply 8 and has a width less than that of the nonfolded ply 10 which is located above ply 9; the folded edges 81 of the ply 8 cover the corresponding edges of the wider nonfolded ply 10. Specific embodiments of the tread reinforcement shown diagrammatically in FIG. 1 are illustrated in FIGS. 2 to 6.

Figure 2:
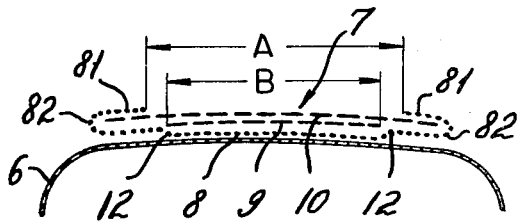
FIGS. 2 to 4 are radial sectional views, on a larger scale than in FIG. 1, of three embodiments or variants of tread reinforcements in accordance with the present invention.

In the embodiment illustrated in FIG. 2, the axial distance A between the ends of the folded edges 81 of the ply 8 is greater than the axial width B of the narrower nonfolded ply 9.

Figure 3:
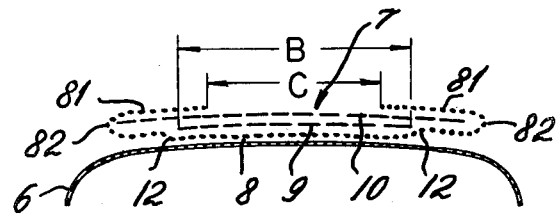

The embodiment illustrated in FIG. 3 differs from that of FIG. 2 solely by the fact that the axial distance C between the ends of the folded edges 81 of the ply 8 is smaller than the axial width B of the narrower nonfolded ply 9.

Figure 4:
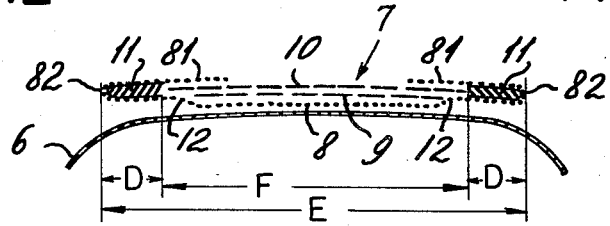
Figure 5:
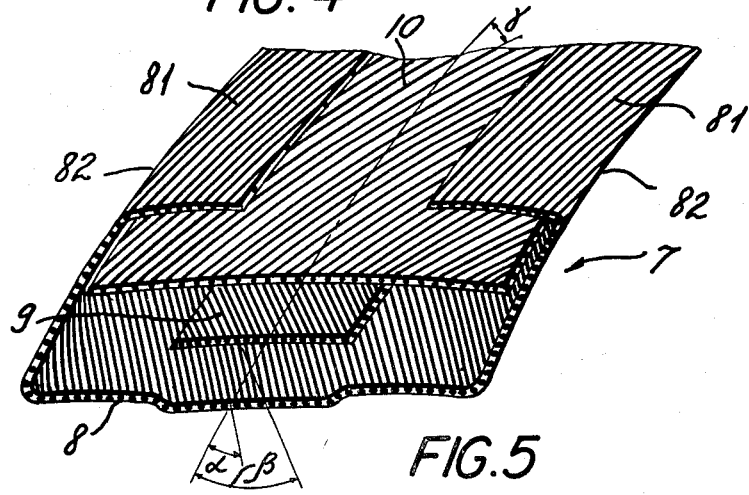
FIG. 5 is a perspective view of a tread reinforcement in accordance with the present invention, showing the orientation of the reinforcement elements of the plies constituting said reinforcement.
Figure 6:
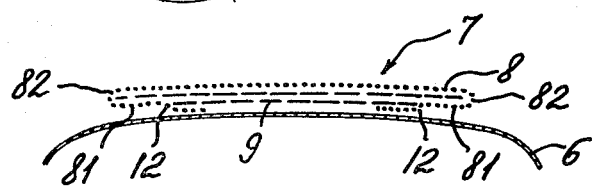
FIG. 6 is a radial sectional view of another embodiment of the present invention.

The embodiment illustrated in FIG. 4 differs from the embodiments of FIGS. 2 and 3 by the fact that the fold lines 82 of the ply 8 are spaced from each other by an axial distance E which is substantially greater than the axial width F of the wider nonfolded ply 10, while in the embodiments in accordance with FIGS. 2 and 3 these fold lines 82 are practically merged with, i.e., practically coincide with, the edges of the wider nonfolded ply 10. The arrangement of FIG. 4 has the advantage of creating on both sides of the tread reinforcement 7 a transition zone 11 having an axial width D of intermediate rigidity in which the tread reinforcement 7 is reduced to two superposed plies formed of the unfolded portion of the ply 8 and by a portion of its folded edge 81.

It is preferably, as shown in FIGS. 2 to 5, that the ply 8 rests in the radial direction as close as possible to the ply 9, on the one hand, and the ply 10, on the other hand. This makes it necessary to impart to the ply 8, at the edges of the ply 9, a slight elbow 12, which is facilitated by the use of a flexible material (for instance, polyamide or polyether) to form the reinforcing elements (wires or cables) of the ply 8.

L (See FIG. 1) being the axial width of the tread 2, that is to say the axial width of the contact area of the tire mounted on its wheel, inflated to its normal pressure and resting on the ground under the effect of its rated load, as contemplated in the present standards, $L_1$ being the total axial width of the ply 8 with folded edges 81, $l_0$ being the axial width of the unfolded portion of said ply 8 and $l_1$ being the axial width of each of the folded edges 81, such that $L_1 = l_0 + 2l_1$, $L_2$ being the axial width of the narrower nonfolded ply 9, $L_3$ being the axial width of the wider nonfolded ply 10 ($L_3 > L_2$), satisfactory results have been obtained by using the following axial widths:

$l_1 > \frac{1}{2}(L - L_2)$, $L_2 < 0.9 L_3$,
$0.6L < L_3 < 1.2L$.

With the exception of the axial width L of the tread 2, all the ply axial widths referred to herein are measured on plies spread out in a plane and perpendicular to the edges of said plies.

Thus, for the manufacture of a tread reinforcement 7 in accordance with the present invention (See FIG. 5) which is intended for a tire of size 185 HR 14, there are used for the ply 8 with folded edges 81 a reinforced ply of polyamide cables 940×2 laid with a pitch of 0.91 mm., having a total axial width $L_1$ equal to 215 mm. and the cables of which form an angle $\alpha$ in the unfolded portion of $+18°$ with repsect to the circumferential direction of the tire, while for the two nonfolded plies 9 and 10 there are used two reinforced plies of steel cables (4 wires of 0.23 mm. diameter) laid with a pitch of 1.1 mm., the adjacent narrower nonfolded ply 9 having an axial width $L_2$ equal to 60 mm. and the cables of which form an angle $\beta$ of $+24°$ with respect to the circumferential direction of the tire, the wider nonfolded ply 10 having an axial width $L_3$ equal to 125 mm. and the cables of which form an angle $\gamma$ of $-24°$ with respect to the circumferential direction of the tire.

Due to the thickness of the plies used, the axial width $L_S$ of the tread reinforcement 7 in accordance with the present invention is greater than the axial width $L_3$ of the wider nonfolded ply 10. $L_S$ is preferably selected in such a manner that $0.6L \leq L_s \leq 1.15L$ With $L_1 \geq 2L_S - L_2$ $L_2 \leq 0.9 L_3$ $0.85 L_S \leq L_3 \leq L_S$ Finally, in FIG. 6 there is shown an embodiment of the present invention in which the ply 8 with folded edges 81 is located above the adjacent wider nonfolded ply 10; in this case, the folded edges 81 of the ply 8 are interposed between the radial carcass ply 6 and the edges of the two nonfolded plies 9 and 10.

What is claimed is:

1. A tire having a radial carcass reinforcement and a tread reinforcement formed of at least two nonfolded diagonal superposed plies of different widths and of at least one diagonal folded ply with two folded edges, each of said folded edges resting on at least a portion of a nonfolded ply, characterized by the fact that (a) the nonfolded plies have axial widths which increase with the radial distances of said plies from the axis of the tire, (b) the folded ply is so arranged that its folded edges cover at least the edges of the widest nonfolded ply, (c) the fold lines of the edges of the folded ply practically coincide with the edges of the widest nonfolded ply and (d) the nonfolded plies are reinforced with relatively rigid cables and the folded ply is reinforced with relatively flexible cables.

2. The tire according to claim 1, characterized by the fact that the widths of the folded edges are such that the axial distance between the ends of these folded edges is greater than the axial width of the narrowest nonfolded ply.

3. The tire according to claim 1, characterized by the fact that the widths of the folded edges are such that the axial distance between the ends of these folded edges is smaller than the axial width of the narrowest nonfolded ply.

4. The tire according to claim 1, characterized by the fact that the unfolded portion of the folded ply and the adjacent nonfolded ply have cables which form angles of the same sign with respect to the circumferential direction of the tire.

5. The tire according to claim 1, characterized by the fact that the unfolded portion of the folded ply is arranged between the carcass reinforcement and the nonfolded plies of different widths.

6. The tire according to claim 1, characterized by the fact that the unfolded portion of the folded ply is arranged radially outward of the nonfolded plies of different widths.

7. The tire according to claim 1, characterized by the fact that, L being the axial width of the tread, $l_1$ being the axial width of each of the folded edges, $L_2$ being the axial width of the narrowest nonfolded ply and $L_3$ being the axial width of the widest nonfolded ply, the axial widths L, $l_1$, $L_2$ and $L_3$ are such that $$l_1 > \tfrac{1}{2}(L-L_2)$$

$$L_2 < 0.9 L_3$$

$$0.6L < L_3 < 1.2L.$$

8. The tire according to claim 1, characterized by the fact that, $L_S$ being the axial width of the tread reinforcement, $L_1$ being the total axial width of the folded ply, $L_2$ being the axial width of the narrowest nonfolded ply, $L_3$ being the axial width of the widest nonfolded ply and L being the axial width of the tread, the axial widths, L, $L_1$, $L_2$, $L_3$ and $L_S$ are such that $$0.6L \leq L_S \leq 1.15L$$

$$L_1 \geq 2L_S - L_2$$

$$L_2 \leq 0.9 L_3$$

$$0.85 L_S \leq L_3 \leq L_S.$$

9. A tire having a radial carcass reinforcement and a tread reinforcement formed of at least two nonfolded diagonal superposed plies of different widths and of at least one diagonal folded ply with two folded edges, each of said folded edges resting on at least a portion of a nonfolded ply, characterized by the fact that (a) the nonfolded plies have axial widths which increase with the radial distances of said plies from the axis of the tire, (b) the folded ply is so arranged that its folded edges cover at least the edges of the widest nonfolded ply, (c) the fold lines of the edges of the folded ply are located at an axial distance apart which is substantially greater than the axial width of the widest nonfolded ply and (d) the nonfolded plies are reinforced with relatively rigid cables and the folded ply is reinforced with relatively flexible cables.

10. The tire according to claim 9, characterized by the fact that the fold lines of the edges of the folded ply are located at an axial distance apart which is between 105% and 200% of the axial width of the widest nonfolded ply.

11. The tire according to claim 9, characterized by the fact that the widths of the folded edges are such that the axial distance between the ends of these folded edges is greater than the axial width of the narrowest nonfolded ply.

12. The tire according to claim 9, characterized by the fact that the widths of the folded edges are such that the axial distance between the ends of these folded edges is smaller than the axial width of the narrowest nonfolded ply.

13. The tire according to claim 9, characterized by the fact that the unfolded portion of the folded ply and the adjacent nonfolded ply have cables which form angles of the same sign with respect to the circumferential direction of the tire.

14. The tire according to claim 9, characterized by the fact that the unfolded portion of the folded ply is arranged between the carcass reinforcement and the nonfolded plies of different widths.

15. The tire according to claim 9, characterized by the fact that the unfolded portion of the folded ply is arranged radially outward of the nonfolded plies of different widths.

16. The tire according to claim 9, characterized by the fact that, L being the axial width of the tread, $l_1$ being the axial width of each of the folded edges, $L_2$ being the axial width of the narrowest nonfolded ply and $L_3$ being the axial width of the widest nonfolded ply, the axial widths L, $l_1$, $L_2$ and $L_3$ are such that $$l_1 > \tfrac{1}{2}(L-L_2)$$

$$L_2 < 0.9 L_3$$

$$0.6L < L_3 < 1.2\,L.$$

17. The tire according to claim 9, characterized by the fact that, $L_S$ being the axial width of the tread reinforcement, $L_1$ being the total axial width of the folded ply, $L_2$ being the axial width of the narrowest folded ply, $L_3$ being the axial width of the widest nonfolded ply and L being the axial width of the tread, the axial widths L, $L_1$, $L_2$, $L_3$ and $L_S$ are such that $$0.6L \leq L_S \leq 1.15L$$

$$L_1 \geq 2L_S - L_2$$

$$L_2 \leq 0.9 L_3$$

$$0.85 L_S \leq L_3 \leq L_S.$$

* * * * *